United States Patent [19]

Blackwood

[11] 4,018,333

[45] Apr. 19, 1977

[54] METAL FASTENER STICKS AND PROCESS OF PREPARING SAME BY CURING POLYMERIC BINDER FOR SAID UNDER CONDITIONS OF U.V. IRRADIATION

[75] Inventor: John C. Blackwood, Melrose, Mass.

[73] Assignee: Stepan Chemical Company, Northfield, Ill.

[22] Filed: Sept. 9, 1976

[21] Appl. No.: 721,705

Related U.S. Application Data

[63] Continuation of Ser. No. 579,948, May 22, 1975, abandoned.

[52] U.S. Cl. .................. 206/343; 59/77; 85/10 R; 85/17; 156/272; 156/296; 206/338; 206/340; 206/346; 427/54; 428/167; 428/173; 428/174; 428/294; 428/358

[51] Int. Cl.² ............... B05D 3/06; B21G 7/02; B65D 85/54; F16B 15/08

[58] Field of Search ........... 206/344 X, 346, 338, 206/340, 343; 119/135 X; 85/10 R, 17; 156/272, 296; 427/54; 428/167, 173, 294, 358, 174; 59/77

[56] References Cited

UNITED STATES PATENTS

| | | | |
|---|---|---|---|
| 2,522,656 | 9/1950 | Whalen | 59/77 |
| 2,927,324 | 3/1960 | Ollig et al. | 206/340 |
| 3,267,660 | 8/1966 | Matthews | 59/77 |
| 3,694,288 | 9/1972 | Iseli | 206/346 |

OTHER PUBLICATIONS

Rybny et al., "Ultraviolet Radiation Cured Coatings," Journal of Paint Technology, 46 (596), pp. 61–69, (1974).

Primary Examiner—J.C. Cannon
Attorney, Agent, or Firm—Richard P. Crowley

[57] ABSTRACT

Metal fastener sticks wherein the individual fastening elements, such as staples, on the stick are secured together by a radiation cross-linked polymer, and which metal fastener stick is prepared by: coating the metal fastener stick with a solventless, radiation-curable, polymeric composition, such as an ultraviolet-curable formulation of an unsaturated resin, a monomer and a photo initiator; and curing the composition by exposing the composition to radiation, such as ultraviolet radiation, to provide a metal fastener stick wherein the individual fastener elements are secured together in the stick through the radiation cross-linked polymer.

28 Claims, No Drawings

METAL FASTENER STICKS AND PROCESS OF PREPARING SAME BY CURING POLYMERIC BINDER FOR SAID UNDER CONDITIONS OF U.V. IRRADIATION

This is a continuation of application Ser. No. 597,948, filed May 22, 1975, and now abandoned.

BACKGROUND OF THE INVENTION

Metal fasteners, such as metal staples, are typically manufactured and sold in stick form, wherein the individual staple elements are placed into a close, contacting, abutting, generally elongated arrangement, and adapted to be inserted into an applicator. The metal staples in the stick form may vary in the quantity of staples, depending upon the particular use. Such individual staples have been secured together through the use of a thermoplastic adhesive material, such as a solvent-based nitrocellulose lacquer, which is coated onto the sides and top of the stick. The amount of the solvent-based thermoplastic adhesive material to be employed must be very carefully controlled, so that a relatively thin and uniform coating amount will be applied. If too much adhesive material is applied, then the adhesive material may tend to clog the applicator wherein the stick is employed, or if too little material is applied, then the individual staples are poorly secured in stick form prior to use.

Present adhesive materials employed constitute an organic solvent-based nitrocellular lacquer having a solids content of from about 20 to 35% which is applied to the staples in stick form, and the stick then heated to drive off the solvent. The speed of ccoating and applying such adhesive material is limited to the speed of the heating and driving off the solvents of the formulation. In production, the viscosity of the solvent-based formulation often varies, and additional solvents must be added to maintain an acceptable viscosity range, which solvent addition changes the amount of solids being applied to the stick, thereby varying the coating layer and adhesive amounts employed. Thus, the present technique of preparing metal fastener sticks and the metal fastener sticks so prepared are not wholly satisfactory, and have many disadvantages. It is understood that prior art attempts have been made to employ hot-melt adhesives as the adhesive material; however, such hot-melt adhesives have not shown the necessary viscosity characteristics which would permit the material to enter into the small fillet between the individual staples, particularly without building up an objectionably high solid adhesive content on top of the staples.

In general, metal staple sticks are prepared by one or two techniques, the first technique being passing a wire through a wire-drawing machine wherein individual staples are cut off and the point ends sharpened, with the individual staples packed onto a rail having a generally U-shape, one staple directly after another to keep the staples in a contacting arrangement. The solvent-based lacquer adhesive is then coated onto the top and onto the sides of the staples. Excess material is removed through a blade or a squeegeeing action, and, thereafter, the staples subjected to heat to drive off the solvent, such as through the electrical heating of the rail onto which the staples are formed, or by the employment of an oven.

A second technique is to employ a plurality of wires; for example, one or two hundred or more, which are placed side to side to form a flat band, and the band then coated on the bottom, top or both with the lacquer material. The adhesive-coated band is then force-dried and placed in rolls, and the rolls later are employed in a cutting and bending operation to form the individual staple sticks. Thus, in both processes, or in variations thereof, a solvent-based lacquer-type material is used, and in both processes such adhesive material requires careful control of viscosity and solids content and only limited production speed is possible, along with other disadvantages well known to the prior art.

SUMMARY OF THE INVENTION

My invention is directed to improved metal fastener sticks formed from a plurality of indivdual metal fasteners which are secured together in stick form by a radiation-cured polymer, and to the process of preparing such improved metal fastener sticks. In particular, my invention concerns a process of coating metal fastener elements, such as staples, with a photo-curable, solventless formulation, and the curing of the formulation through the use of photo radiation, such as ultraviolet light, to form a radiation-cured polymer as the adhesive element to secure the metal fasteners in stick form.

My improved fasteners comprise a stick to include a roll, coil or other collective grouping of metal fasteners, the individual fasteners arranged in a close contacting relationship or arrangement, wherein each fastener is secured to its fellow fastener through a small amount typically in a thin coating of a radiation-cured, and preferably a photo ultraviolet radiation-cured, cross-linked, polymeric, adhesive material. Based on the type and nature of the particular metal fasteners to be secured, a cross-linked adhesive is applied in the amount sufficient to retain the indivdual fasteners in the desired relationship; for example, in roll form, or in an elongated straight stick form, without having such individual fasteners become loose or break off during normal handling or usage, but not in any amount so excessive as to create problems in the use of such fasteners, such as in applicators. Metal fasteners, such as staples, are secured together by the cross-linked polymer through coating the polymerizable polymer in small amounts between the individual staples either on the top, bottom or side, or a combination thereof, to amounts ranging from about 0.1 to 3 mils; e.g., 0.5 to 2 mils, in coating thickness. Where desirable, the degree of cross-linking of the polymeric adhesive material employed may be varied in order to permit the fasteners to be flexible in nature, such as when manufactured, stored or used in roll form, or when used on a curved mandrel feed to a gun, rather than in elongated form wherein a less flexible and more highly cross-linked polymer may be employed.

The process of producing the improved metal fasteners of my invention comprises applying an adhesive amount of a radiation-curable, solventless, polymeric composition to a plurality of metal fasteners, the individual fasteners in a close contacting relationship, and, thereafter, curing the polymer composition by radiation, typically by the use of an ultraviolet radiation or photo-polymerization technique, to cross-link the polymer and to secure the individual metal fasteners together in the desired arrangement, and with a desired degree of adhesiveness. It has been found that the employment of radiation-curable, solventless, polymeric compositions permits lesser quantities of the material to be used, as compared to comparable thermoplastic lacquer compositions employed in the past.

My improved fasteners and the method of manufacturing such fasteners provide numerous advantages and superior and unexpected results over the fasteners and techniques employed in the prior art. For example, not only in many applications can nonsolvent radiation-cured products be employed to accomplish the same purpose as in the prior art, but such adhesive material, being thermosetting in nature, is not affected by variations in temperatures as the lacquers are, and, therefore, has advantages in the employment of metal fasteners in applicators where softer, temperature-variable and cold-flowable lacquers tend to gum and stick in such applicators more frequently than my cured material.

The radiation-curable formulations employed are essentially free of solvents; that is, contain preferably and essentially all active ingredients, thereby avoiding any difficulties associated with solvent-based coatings, such as, for example, the problems of fire hazards, the use of special equipment and switches and the discharge of solvent vapors. Prior art solvent-based lacquers have been difficult to apply in the desired small and carefully controlled quantities, since typically, as production proceeds and the lacquer having a viscosity of 50 to say 6000 cps is applied, the solvent is added to maintain viscosity control which affects the amount of material applied to the fasteners. However, in my process, the problems associated with the use and disposal of solvent vapors and the variation in amounts of adhesive solids caused by the use of solvents are avoided, since the reactive monomer and oligomer in the radiation-curable formulations are typically liquid, and, therefore, the formulation can be applied as desired in careful and controlled amounts, and does not require this prior art careful and constant operator attention.

Further, a most important advantage relating to my process is that the polymerization may be carried out at room temperature; e.g., 65°–80° F, and employs formulations having a long pot life and virtually unlimited open time, and provides a cross-linked radiation-adhesion material with no toxic residues in the cross-linked adhesive. A desirable advantage is that the production speed of applying the radiation-curable composition is quite high, since there is no speedlimitation, such as the requirement to drive off solvents by heat, but rather, radiation is quickly and effectively carried out in the preferred embodiment through exposure to untraviolet radiation, permitting very high production speeds of over 20 feet per minute, and typically up to 200 or more feet per minute, with the only limitation being the speed of wire handling and forming the metal fasteners in the desired form, which is the converse of the present prior art practice. My formulations have a constantly adjusted viscosity e.g., 1000 to 6000 cps, so that the material flows readily into and between the individual metal fasteners, such as the V-groove in between the staples which forms a small fillet which is easily radiation cross-linked. Such formulations also provide for good adhesion to the metal.

My invention will be described for the purpose of illustration only and in its preferred embodiment directed to a process and technique of preparing an improved stick of metal staples composed of a plurality of individual, generally U-shaped-type staples, such as those staples which are typically employed in a staple applicator wherein the applicator mechanically dispenses and secures staples to a desired material from a stick inserted into the staple applicator. However, it is recognized and a part of my invention that the techniques and processes described in connection with the metal staples are equally applicable to a wide variety of metal-fastening elements, wherein individual fastening elements are secured together for either individual or group application. Typical metal fasteners in the practice of my invention would include groupings of fasteners, C-type hog rings, as well as nails, screws, spikes or other small fastening-type elements which are adhered together in groups. The term "metal fasteners" used herein refers to such elements individually or in any combination.

In my preferred process as described and set forth herein, my radiation, cross-linkable, curable, polymer formulations are cross-linked employing light radiation, and particularly ultraviolet light, to effect cross-linking and curing. However, it is recognized that a wide variety of radiation may be employed which has various ionizing radiation doses, for example, greater than 0.1, such as 0.1 to 10, megarads, and may also be employed to obtain a high degree of cross-linking. Such method of radiation may be employed where economy permits such technique of curing of the fasteners with high-energy radiation. Such radiation can be obtained from atomic pile, cobalt 60, an accelerator, an electron accelerator, a betatron, a cyclotron or other sources which produce electrons, protrons, neutrons, photons, gamma rays, X-rays, alpha and beta particles to effect cross-linking of the solventless curable polymer. Radiation and cross-linking can be desirably effected at room or production temperatures, but if desired, may also be effected at depressed or elevated temperatures, particularly if such temperatures are useful in providing increased speeds. In ultraviolet-curable formulations, the formulation, particularly as a thin coating, is exposed for a short period of time to an ultraviolet source, such as a mercury vapor lamp, to accomplish the desired polymerization; e.g., 0.1 to 5 seconds.

The radiation-curable compositions employed in my invention are preferably those photo-curable acrylate systems which comprise in combination an unsaturated resin or polymer, a multifunctional cross-linking diluent and a small amount of a photo initiator, and optionally other additives, such as synergistic or small amounts of photo synergists, reactive and nonreactive oligomers, and where desired, stabilizers, antioxidants, dyes, pigments, fillers, foaming agents and the like. In my photo-curable composition, fillers are not conventionally employed or employed in small amounts, while a multifunctional acrylate monomer liquid is required to function as a cross-linking agent and as the reactive solvent in the nonsolvent system.

The unsaturated resin employed in my formulation may be composed of a variety of materials which include, but are not limited to, acrylated polyethers, acrylated polyester-based urethanes, methacrylate polyesters, acrylated epoxy resins. The multifunctional monomers are typically cross-linking di and multifunctional acrylates, such as, for example, neopentyl glycol diacrylate, hexanediol diacrylate, pentaerythritol triacrylate and trimethylolpropane triacrylate. Optionally, my photo-curable formulations may include a monofunctional acrylate diluent, such as 2-ethylhexylacrylate, hydroxyethylacrylate, isodecylacrylate, methylcellosolve acrylate, cellosolve acrylate and the like. Various nonreactive additives, such as oligomers and polymers, may be employed typically in minor amounts, such as, for example, polyvinyl acetate resins.

The ultraviolet photo-curable formulations require the presence of a small initiating amount of a photo initiator, such as, for example, in acrylates the use of benzophenone, benzoinethylether or 2,2-diethoxyacetophenone. Such photo initiators are often employed in combination with small amounts of sensitizing or synergistic agents, such as, for example, alkyl amines, alkanol amines and morpholines. A photo initiator system suitable for use would include a mixture of two parts of benzophenone and three parts of ethyl diethanolamine. The compositions are prepared with desired viscosities to permit the material to be flowed by gravity or to be forced into intimate contact between the individual metal-fastening elements in a thin film.

In a typical system suitable for use in my process, the oligomer/polymer is in an amount of from about 40 to 80 parts by weight, the cross-linker in an amount of from about 20 to 60 parts by weight, a monofunctional acrylate in an amount of from about 0 to 20 parts by weight, a nonreactive oligomer or polymer from about 5 to 20 parts weight, the photo initiator system including a sensitizer in an amount of from about 1 to 10 parts by weight. Typical ultraviolet radiation-cured coating formulations are set forth, for example, in the Journal of Paint Technology, Volume 46, No. 596, pages 60–69, September 1974, hereby incorporated by reference.

BRIEF DESCRIPTION OF THE EMBODIMENTS

Metal staples are generally U-shaped having each end sharpened and are formed into a close, contacting, aligned, elongated arrangement to form a rail or channel-type conveyor, and move forward over and through a coating or distributing-type device, such as a slot, orifice or tube, which directs a photo-curable acrylate formulation onto the outsides, top and insides of the staples as they pass by the coating section. The formulation coated onto the exterior surfaces is distributed generally by a wiping and spreading action, such as with a flexible rubber blade in contact with the top and sides of the metal staples, by a shaped die with an internal clearance sufficient to lay down the desired amount of from about 0.1 to 1 mil thickness of the formulation onto the staple surface. The formulation as applied typically has a viscosity of about 4000 to 6000 cps, and is applied by gravity flow or by air pressure. After coating with the solventless photo-curable reactive acrylate formulation, the metal staples so coated are moved to a radiation station which comprises one or a series of ultraviolet medium-pressure mercury lamps, such as a 200-watt-per-inch lamp whereby the coated areas of the metal staples are exposed to the ultraviolet light. Where desirable, a reflector or an optical system may be used for focusing the ultraviolet radiation directly onto the coated top and sides of the fastener stick as it moves through the production line. The coating may be applied to the outside of the staples only, or to the outside and all or a part of the inside of the staple. Exposure time required for adhesive cure is primarily dependent upon adhesive recipe, thickness of adhesive film, optical design of the lamp reflector and direction of travel of a coated substrate under the lamp; e.g., either perpendicular to focused lamp energy or directly beneath and moving along the length of the focused energy beam. Using as an example the case of curing a continuous wire bundle coated with a 1 mil thick adhesive and moving at right angles to the focused ultraviolet energy, the wire speed is about 10 feet/minute/lamp, while a line speed of about 50 feet/minute requires five lamps. After coating and curing, the fasteners are moved from the production line and packaged in sticks of desired length or in coils or tubes for later packaging, or in coils for commerical applicators.

Prior to the application of the photo-curable formulation, it is sometimes desirable to clean the exterior metal surface and free the surface of wire-drawing lubricants from the wire-drawing machine, grease or the like, typically through the use of solvents or solvent-degreasing operations, and the drying of the clean metal staples prior to applying the formulation to the photocurable formulation.

A typical formulation to be employed in my process in preparing my improved fasteners is as follows:

TABLE I

| Ingredient | Parts by Weight |
|---|---|
| Acrylated oligomer (Actomer X-80[1]) | 80 |
| Hexanediol diacrylate | 20 |
| Vinyl pyrrolidone | 5 |
| Benzophenone | 2 |
| Dimethylethanol amine | 2 |
| Pentalyn 344 ester resin[2] | 5 |
| Hycar VTBN[3] | 3 |
| Makon 10[4] | 1 |

[1] a polyfunctional acrylate oligomer with oil-like character by Union Carbide Corporation under the trademark Actomer X-80.
[2] an ester resin used as a tackifier to improve metal adhesion, a trademark of Hercules, Inc.
[3] a vinyl-terminated butadiene-nitrile copolymer, a trademark of B.F. Goodrich Co.
[4] an ethoxylated nonyl phenol surfactant with an average of 10 ethylene oxide groups per molecule by Stephan Chemical Company.

Sometimes the metal fastener elements, such as nails or screws, include a first coating on the surface referred to as a withdrawal compound, and which is employed in the thin coating to increase the force required to withdraw the fastener from the substrate once the fastener has been secured into the substrate. Typically, the withdrawal compounds adhere to the metal surface when driven into the substrate, such as a coating on a nail driven into wood, and subsequently moves, cold-flows and otherwise reacts within the substrate after application to increase the level of adhesion strength so as to make withdrawal or removal more difficult. Of course, metal fasteners may be varied by use of mechanical serrations or the like, screws or threads in order to enhance further this adhesion force. If desired, the photo-curable formulations may be applied over the conventional withdrawing compound, or used themselves in a multifunctional manner both as an adhesive and as a withdrawal compound.

My process and improved metal fasteners have been described in particular as regards photo-curable acrylate systems, and such systems are particularly adaptable to high metal adhesion and lend themselves to high curing rates with ultraviolet radiation. Such acrylate formulations must contain not only multifunctional acrylate oligomers, but multifunctional acrylate monomers in order to permit the desired high degree and high speed of polymerization, adhering the metal fasteners.

What I claim is:
1. A metal-fastener assembly which comprises a plurality of individual metal fasteners in a closely aligned relationship, the individual fasteners secured together by an adhesive amount of an ultraviolet-radiation, cross-linked polymer, the polymer, prior to irradiation, comprising a polymer composition of an acrylated unsaturated polymer, a multifunctional acrylate monomer and an ultraviolet-photo initiator.

2. The fastener assembly of claim 1 wherein the metal-fastener assembly is characterized by a small groove between individual fasteners, the groove containing an adhesive amount of the cross-linked polymer.

3. The fastener assembly of claim 1 wherein the polymer composition includes a polyvinyl-acetate resin.

4. The fastener assembly of claim 1 wherein the polymer composition includes a monofunctional acrylate diluent and a photo-sensitizing agent.

5. The fastener assembly of claim 1 wherein the metal fastener comprises a hog ring or metal staple with a groove between individual rings or staples, the groove containing an adhesive amount of the cross-linked polymer.

6. The fastener assembly of claim 2 wherein the adhesive amount of the cross-linked polymer is essentially coated in a thin fillet in the groove only on the exterior top of the ring or staple.

7. A metal staple stick which comprises a plurality of generally inverted, U-shaped, individual, metal staples in a closely aligned relationship in stick form, with a small groove between individual staples, the staples secured together by a thin adhesive amount of a small fillet of an ultraviolet-radiation, cross-linked polymer in the grooves on the exterior top of the metal staples, the polymer, prior to irradiation, comprising a cross-linked, acrylated, unsaturated polymer, a multifunctional acrylate monomer and an ultraviolet-photo initiator.

8. The assembly of claim 7 wherein the metal staples include a thin coating of a withdrawal compound.

9. The assembly of claim 7 wherein the polymer comprises a small fillet of from about 0.1 to 3 mils thickness essentially only on the top of a generally inverted U-shaped metal staple stick.

10. The assembly of claim 7 wherein the acrylate polymer includes a dye.

11. A process of manufacturing a metal-fastener assembly, which assembly comprises a plurality of individual metal fasteners in a closely aligned relationship, which process comprises:
a. applying a coating of an adhesive amount of an ultraviolet-radiation-curing polymer composition onto the metal-fastener assembly, the polymer composition comprising an acrylated unsaturated polymer, a multifunctional acrylate monomer and an ultraviolet-photo initiator; and
b. exposing the applied polymer composition to ultraviolet radiation in an amount to effect the curing of the polymer composition, thereby providing for the securing together of the individual metal fasteners in the fastener assembly.

12. The process of claim 11 wherein the metal-fastener assembly is characterized by a small groove between individual metal fasteners, and which process includes casting the polymer composition onto the exterior surface of the assembly and into the grooves.

13. The process of claim 11 wherein the metal fasteners comprise a hog ring, metal staples, nails and screws.

14. The process of claim 11 which includes varying the degree of curing of the polymer composition to permit the fastener assembly to be flexible and to be adapted to be employed in roll or curved form.

15. The process of claim 11 wherein the polymer composition is applied as a coating to a plurality of closely grouped, side-by-side wires in band form, and the polymer is cured prior to forming the wires into the final fastener-assembly form.

16. The process of claim 11 which includes exposing a coating of from about 0.1 to 3 mils in thickness of the polymer composition for a period of from about 0.1 to 5 seconds to a curing amount of ultraviolet radiation.

17. The process of claim 11 which includes exposing the polymer composition to an ultraviolet, mercury-vapor lamp.

18. The process of claim 11 wherein the polymer composition includes a polyvinyl-acetate resin.

19. The process of claim 11 wherein the polymer composition includes a monofunctional acrylate diluent.

20. A process of manufacturing a metal-fastener stick assembly, which assembly comprises a plurality of individual fasteners in a close, contacting, aligned relationship, with grooves between individual metal fasteners, and which process comprises:
a. applying an adhesive amount of an adjusted-viscosity, ultraviolet-radiation-curable, solventless, polymer composition which comprises a cross-linkable, unsaturated, acrylated polymer, a multifunctional acrylate monomer and an ultraviolet-photoinitiator into the grooves of the metal fastener assembly; and
b. exposing the polymer in the grooves to ultraviolet radiation in an amount to effect the curing and cross-linking of the polymer composition as a small fillet in said grooves, thereby providing for the securing together of the individual fasteners in the metal-fastener assembly.

21. The process of claim 20 wherein the polymer composition is applied onto the exterior top of the metal fastener in aligned form and into said grooves to provide a small fillet in the grooves ranging from about 0.1 to 3 mils in thickness.

22. The process of claim 20 wherein the formulation has a viscosity ranging from about 1000 to 6000 cps.

23. The process of claim 20 wherein the unsaturated polymer comprises an acrylated apoxy resin.

24. The process of claim 20 wherein the polymer is exposed for a period of time to an ultraviolet-radiation source of from 0.1 to 5 seconds.

25. The process of claim 20 wherein the polymer composition is applied as a coating to a plurality of closely grouped, side-by-side wires in band form, and the polymer is cured prior to forming the wires into the final fastener-assembly form.

26. The process of claim 20 which includes exposing the polymer compositon to ultraviolet radiation while the assembly is moving at a speed of from about 20 to 200 feet per minute.

27. The process of claim 20 wherein the polymer composition contains a dye.

28. A process of manufacturing a metal-staple stick, which process comprises:
a. forming a plurality of individual metal staples in a closely aligned relationship, with a small groove between individual staples;
b. applying an adhesive amount of from about 0.1 to 3 mils in thickness onto the exterior top and into the grooves of the metal staples of an ultraviolet-radiation, cross-linkable, solventless, liquid, metal-adhering, polymer composition which comprises an acrylated, unsaturated polymer, a multifunctional acrylate monomer and a photo initiator, the composition having an adjusted viscosity so that the composition flows only into the grooves between the staples; and c. exposing the applied coating to a source of ultraviolet radiation for a period of time of from about 0.1 to 5 seconds to effect the cross-linking of the polymer composition.

* * * * *

UNITED STATES PATENT OFFICE
CERTIFICATE OF CORRECTION

PATENT NO. : 4,018,333
DATED : April 19, 1977
INVENTOR(S) : John C. Blackwood

It is certified that error appears in the above—identified patent and that said Letters Patent are hereby corrected as shown below:

In claim 6, line 20, amend "2" to read --5--.

In claim 23, line 44, amend "apoxy" to read --epoxy--.

Signed and Sealed this

Twenty-first Day of June 1977

[SEAL]

Attest:

RUTH C. MASON
Attesting Officer

C. MARSHALL DANN
Commissioner of Patents and Trademarks